June 6, 1961 C. J. OXFORD, JR., ET AL 2,986,960
GUN DRILL AND THE METHOD OF PRODUCING THE SAME
Filed June 15, 1959
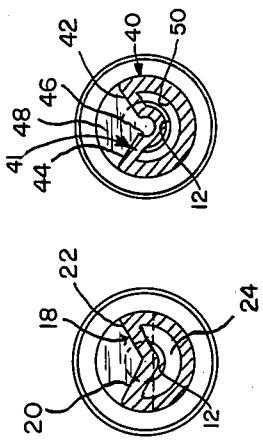
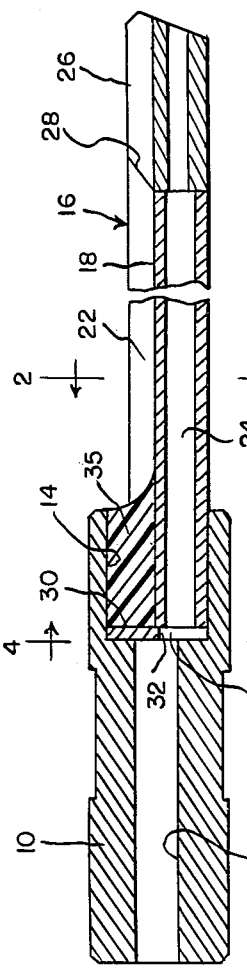
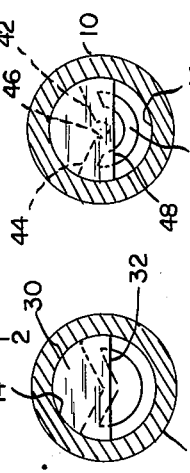
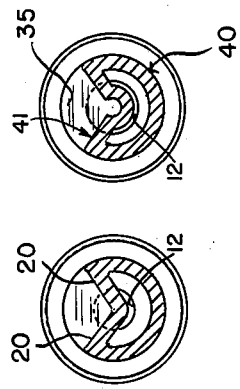
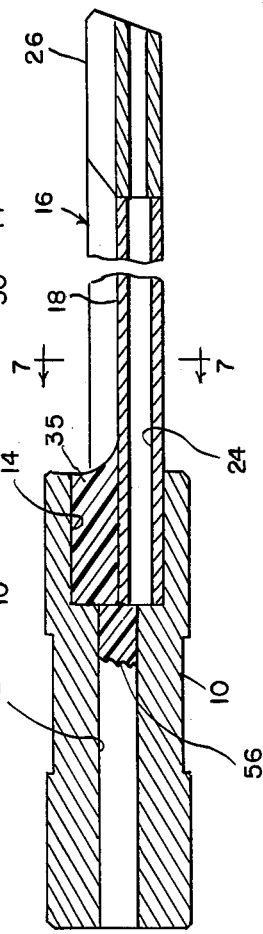
INVENTORS
CARL J. OXFORD JR.
MARVIN W. MITZELFELD
BY DANIEL J. SULLIVAN JR.
ATTORNEYS

United States Patent Office 2,986,960
Patented June 6, 1961

2,986,960
GUN DRILL AND THE METHOD OF PRODUCING THE SAME
Carl J. Oxford, Jr., and Marvin W. Mitzelfeld, Rochester, and Daniel J. Sullivan, Jr., Huntington Woods, Mich., assignors to National Twist Drill & Tool Company, Rochester, Mich., a corporation of Michigan
Filed June 15, 1959, Ser. No. 820,382
13 Claims. (Cl. 77—68)

The present invention relates to an improved gun drill and the method of producing the same.

In accordance with the present invention the drill comprises an elongated tube having a shank at one end adapted to be received in a chuck or suitable holding and driving fixture, and a cutting head at the other end. The drill conveniently is formed by deforming a cylindrical tube to have a re-entrant side. In the past drills of this type have been formed from tubular stock by a rolling operation in which a cylindrical tube is rolled from one end to a point adjacent the other end, leaving the intermediate portion of the tube with a depressed re-entrant side, but leaving the shank end of the tube cylindrical for mounting in a shank having a circular recess for receiving the cylindrical end of the tube.

In accordance with the present invention tubular stock may be rolled completely from end to end so that rolled stock may be maintained as inventory and cut to whatever length is required to produce a particular drill on order. This avoids the necessity of rolling short lengths of stock to order, and results in a considerable overall saving in the manufacture of gun drills.

It is accordingly an object of the present invention to provide a method of making gun drills which includes the steps of rolling elongated tubular stock completely from end to end to form a re-entrant side, thereafter severing a required length of the rolled tube, brazing an end of the tube including its re-entrant side in a cylindrical recess in the shank, and filling the gap between the re-entrant side and the side of the cylindrical recess with a suitable filler material.

It is a further object of the present invention to provide a method as described in the preceding paragraph which includes the step of initially seating a flat partially cylindrical washer in the bottom of the cylindrical recess, the washer defining with said cylindrical recess an opening affording communication between the hollow interior of the rolled tube and an axial passage extending through the shank but serving to close and shut off communication between the axial passage in the shank and the channel defined by the re-entrant side of the tube.

It is a further object of the present invention to provide a gun drill comprising a shank having an axial passage therethrough and a cylindrical recess at one end, a tubular drill body of partially cylindrical configuration having a re-entrant side, one end of the drill body being secured within said cylindrical recess with its cylindrical portion brazed or otherwise secured to the cylindrical side surface of the recess, and a plug located in the space in the recess defined between the inner and end wall of the recess and the confronting re-entrant side portions of the drill body located within the recess.

It is a further object of the present invention to provide a drill as defined in the preceding paragraph which includes a flat segmental washer having a portion cutting off communication between the axial passage in the shank and the channel between the portions of the re-entrant side wall of the drill body located within the recess and the confronting side wall of the recess while being shaped to afford communication between the aforesaid axial passage through the shank and the interior of the tubular drill body.

Other objects and features of the invention will become apparent as the description proceeds, especially when taken in conjunction with the accompanying drawing, illustrating prefered embodiments of the invention, wherein:

FIGURE 1 is a longitudinal sectional view of an elongated gun drill with the intermediate portion of the tubular drill body broken away.

FIGURE 2 is a section on the line 2—2, FIGURE 1, showing one embodiment of the invention.

FIGURE 3 is a view similar to FIGURE 2 showing a somewhat different embodiment of the present invention.

FIGURE 4 is a sectional view on the line 4—4, FIGURE 1, showing the embodiment of the invention illustrated in FIGURE 2.

FIGURE 5 is a view similar to FIGURE 4 showing the embodiment of the invention illustrated in FIGURE 3.

FIGURE 6 is a longitudinal sectional view of a modified form of gun drill.

FIGURE 7 is a sectional view on the line 7—7, FIGURE 6.

FIGURE 8 is a view similar to FIGURE 7 showing yet another embodiment of the present invention.

At the present time gun drills are provided for drilling deep holes and include a shank end adapted to be supported in a driving head, a cutting end opposite the shank end, and an elongated tubular drill body interconnecting the shank head ends. The drill body is formed of tubular stock which is rolled longitudinally to provide a re-entrant side. In the drilling operation coolant is forced through the drill longitudinally and out the head and into the drill hole where it escapes along the side of the drill body through the passage defined between the re-entrant side of the drill body and the hole.

In the past drill bodies as described above have been formed by an operation in which a predetermined length of tubular drill stock is rolled longitudinally from one end to a point adjacent to but spaced from the other end, thereby leaving the shank end of the drill body of its initial cylindrical tubular configuration. This cylindrical shank end of the drill body was then brazed in a cylindrical recess in a shank. This method of forming drills had the disadvantage that the drill body required rolling after it had been cut to predetermined length so that it was necessary to provide a relatively large number of previously partially rolled drill bodies, or alternatively, it was necessary to carry out the rolling operation each time a drill of a specific length was to be made.

In accordance with the present invention the tubular drill stock is initially rolled throughout its entire length. The rolling operation is thus completed and in order to complete the drill it is only necessary to cut off the required length of the drill body and to attach it to the shank.

However, the operation of connecting the rolled end of a drill body in a cylindrical recess in a shank requires a particular operation to produce the required registration between an axial hole in the shank and the passage through the rolled drill body, as well as to seal off the axial passage through the shank to cause all of the coolant to flow through the drill.

Referring now to the drawings, and particularly FIGURES 1–5, there is illustrated a shank 10 having an elongated central axially extending passage 12 therethrough through which coolant flows. At one end the shank is provided with a radially enlarged cylindrical recess 14.

The completely rolled tubular drill body is indicated at 16 and as best seen in FIGURE 2, is formed of tubular stock rolled longitudinally completely from end to end to provide a re-entrant side or channel 18. The channel 18 as illustrated, comprises side walls 20 and 22 intersecting substantially at the center line of the originally cylindrical tubular stock. The operation results in a substantial reduction in cross-sectional area of the central passage which as indicated at 24 in FIGURE 2, is of a crescent shape. At the cutting end of the drill body a cutting head 26 is brazed or otherwise attached as is conventional in the art. Conveniently, the head 26 may have a substantially V-shaped end received in a concavely formed V-shaped notch 28.

The problem of securing an end of the completely rolled tubular drill body in the cylindrical recess in the shank is complicated by two requirements not present when the drill body is only partially rolled and the shank end portion is of complete cylindrical configuration. The first of these requirements is for communication between the passage 12 in the shank and the longitudinal passage 24 extending through the drill body. The second requirement is that means be provided effective to prevent the escape of coolant from the passage 12 except through the passage 24 provided in the drill body. As seen in FIGURE 2, the passage 12 has portions in endwise alignment both with the passage 24 and the channel 18.

These requirements are met by providing a washer 30 in the form of a flat partially cylindrical disc whose shape is best seen in FIGURE 4. The disc 30 fits nicely within the cylindrical recess 14 and is provided with a transverse straight edge 32 leaving a substantial passage 34 for the flow of fluid from the passage 12 to the passage 24. At the same time, it will be observed that the segmental cylindrical disc or washer 30 closes the inner end of the channel defined between the portions of the re-entrant walls 20 and 22 within the recess 14 and the portion of the inner cylindrical wall of the recess 14 which confronts the aforesaid portions of the re-entrant surfaces.

The washer or disc 30 is brazed in the bottom of the recess 14 and the inner rolled end of the drill body 16 is also brazed in place. As best seen in FIGURES 2 and 4, it will be observed that the end of the rolled tubular drill body, which is cut off square, has a substantial area contact with the outer flat surface of the disc or washer 30 so that the brazing is accomplished to braze the disc or washer to contacting surfaces of the recess in the shank, to braze the cylindrical outer surface of the drill body to the cylindrical side wall of the recess 14 of the shank, and to braze the overlapping end surfaces of the drill body to the flat side surfaces of the washer or disc 30. This provides a secure attachment and mounting of the end of the drill body in the shank. The chamber thus formed is thereafter filled with a plug 35. The plug 35 may be of a castable resin such for example as epoxy resin. This material bonds firmly to the metal of the shank, drill body and washer, and prevents chips from catching in the recess between the grooved shank and the adapter.

Referring now to FIGURES 3 and 5 there is illustrated a slightly different embodiment of the invention which differs primarily in the cross-sectional shape to which the tubular drill body is rolled. In these figures the drill body is designated 40 and differs from the drill body 16 primarily in that when rolled to provide a channel 41 formed in the re-entrant side between the side wall portions 42 and 44 a central recess 46 is also formed being of partially cylindrical configuration concentric with the axis of the drill. This longitudinally extending partially enclosed passage receives an undrilled portion of the material of the work piece which serves to guide the drill during the operation. In this case, as best seen in FIGURE 5, the rolled end of the drill body is received in the cylindrical recess 14 of the shank 10 in the same way as in the first embodiment of the invention, but a somewhat larger partially cylindrical disc 48 is provided. This disc again, serves the function of closing off the passage in the recess 14 from the channel formed by the re-entrant side wall of the drill body, while at the same time affording communication between the axial opening or passage 12 through the shank, and the passage 50 extending longitudinally through the drill body.

Referring now to FIGURES 6 and 7 there is illustrated a modification of the invention in which the parts are as shown in FIGURES 1, 2 and 4 except that the disc or washer 30 is omitted. Like parts are identified by the same reference characters as in FIGURES 1, 2 and 4. In this case, instead of using a disc or washer such as shown at 30, the passage 12 may be initially filled with a suitable plugging material 56 which may subsequently be removed by melting, dissolving, or the like. This material serves to close the bottom of the chamber defined in the recess 14 between the channel 18 and the adjacent wall of the recess 14. While the passage 12 is thus filled with the material 56, the plug 35 may be cast or otherwise formed in place to interrupt communication between the shank passage 12 and the channel 18 in the drill body. The end portion of the drill body received in the recess 14 is of course brazed or otherwise firmly bonded in place. After the plug 35 has been provided, the sealing material 56 is melted, dissolved, or otherwise removed to re-establish communication between the passage 12 in the shank and to the passage 24 in the drill body.

Attention is drawn to the fact that the connection provided by brazing the end portion of the drill body in the cylindrical recess provides a strong and firm support. This is because the drill body is formed to have substantially more than 180 degrees of its original cylindrical wall which may be brazed in full surface to surface contact with the cylindrical surface of the recess in the shank. In the illustrated form of the invention it will be noted that the side walls of the channel form an obtuse angle of approximately 105 degrees which means that approximately 255 degrees of the original cylindrical wall surface of the drill body remain intact for brazing to the cylindrical surface of the recess in the shank 10.

In FIGURE 8 there is illustrated the combination of a drill body 40 having the cross-sectional configuration illustrated in FIGURE 3, seated in the shank recess 14 and provided with the sealing and reinforcing plug 35 by a method which involves the temporary closure of the passage 12 by the removable material 56.

The drawing and the foregoing specification constitute a description of the improved gun drill and the method of producing the same, in such full, clear, concise and exact terms as to enable any person skilled in the art to practice the invention, the scope of which is indicated by the appended claims.

What we claim as our invention is:

1. A gun drill comprising a shank having a passage extending therethrough and an enlarged cylindrical recess at one end in communication with the passage, a tubular drill body of uniform cross-section from end to end, the cross-section of said drill body being generally cylindrical with one side wall shaped inwardly to form a channel extending approximately to the axis of said body and to leave a passage extending longitudinally therethrough, said body having an exterior cylindrical surface substantially in excess of 180 degrees, an end of said body fitting and having a brazed connection with the adjacent walls of the recess in said shank, said body having a passage extending longitudinally thereof in communication with the passage through said shank, and a plug filling the space within the recess in said shank exterior to the end portion of said drill body.

2. A gun drill comprising a shank having a passage extending therethrough and an enlarged cylindrical recess at one end in communication with the passage, a tubular drill body of uniform cross-section from end to end, the cross-section of said drill body being generally cylindrical with one side wall shaped inwardly to form a channel extending approximately to the axis of said body and to leave a passage extending longitudinally therethrough, said body having an exterior cylindrical surface substantially in excess of 180 degrees, an end of said body fitting and having a brazed connection with the adjacent walls of the recess in said shank, said body having a passage extending longitudinally thereof in communication with the passage through said shank, and a solid plug of hard material filling the space within the recess in said shank exterior to the end portion of said drill body.

3. A gun drill comprising a shank having a passage extending therethrough and an enlarged cylindrical recess at one end in communication with the passage, a tubular drill body of uniform cross-section from end to end, the cross-section of said drill body being generally cylindrical with one side wall shaped inwardly to form a channel extending approximately to the axis of said body and to leave a passage extending longitudinally therethrough, said body having an exterior cylindrical surface substantially in excess of 180 degrees, an end of said body fitting and having a brazed connection with the adjacent walls of the recess in said shank, said body having a passage extending longitudinally thereof in communication with the passage therethrough said shank and a solid plug of hard resin material filling the space within the recess in said shank exterior to the end portion of said drill body.

4. A gun drill comprising a shank having a passage extending therethrough and an enlarged cylindrical recess at one end in communication with the passage, the bottom wall of said recess being flat, a tubular drill body of uniform cross-section from end to end, the cross-section of said drill body being generally cylindrical with one side wall shaped inwardly to form a channel extending approximately to the axis of said body and to leave a passage extending longitudinally therethrough, said body having an exterior cylindrical surface substantially in excess of 180 degrees, an end of said body fitting within and having a brazed connection with the recess in said shank, said body having a passage extending longitudinally thereof in communication with the passage through said shank, a segmental disc in the bottom of said recess, having a brazed connection with the adjacent walls thereof, and defining an opening connecting the passage in said shank to the passage in said drill body, said disc having a solid portion shaped to form a barrier between the passage in said shank, and the space defined by the inwardly shaped wall portion of the drill body and the recess in said shank, and a plug filling the space within the recess in said shank exterior to the end portion of said drill body.

5. A gun drill comprising a shank having a passage extending therethrough and an enlarged cylindrical recess at one end in communication with the passage, the bottom wall of said recess being flat, a tubular drill body of uniform cross-section from end to end, the cross-section of said drill body being generally cylindrical with one side wall shaped inwardly to form a channel extending approximately to the axis of said body and to leave a passage extending longitudinally therethrough, said body having an exterior cylindrical surface substantially in excess of 180 degrees, an end of said body fitting within and having a brazed connection with the recess in said shank, said body having a passage extending longitudinally thereof in communication with the passage through said shank, a segmental disc in the bottom of said recess, having a brazed connection with the adjacent walls thereof, and defining an opening connecting the passage in said shank to the passage in said drill body, said disc having a solid portion shaped to form a barrier between the passage in said shank, and the space defined by the inwardly shaped wall portion of the drill body and the recess in said shank, and a solid plug of hard material filling the space within the recess in said shank exterior to the end portion of said drill body.

6. A gun drill comprising a shank having a passage extending therethrough and an enlarged cylindrical recess at one end in communication with the passage, the bottom wall of said recess being flat, a tubular drill body of uniform cross-section from end to end, the cross-section of said drill body being generally cylindrical with one side wall shaped inwardly to form a channel extending approximately to the axis of said body and to leave a passage extending longitudinally therethrough, said body having an exterior cylindrical surface substantially in excess of 180 degrees, an end of said body fitting within and having a brazed connection with the recess in said shank, said body having a passage extending longitudinally thereof in communication with the passage through said shank, a segmental disc in the bottom of said recess, having a brazed connection with the adjacent walls thereof, and defining an opening connecting the passage in said shank to the passage in said drill body, said disc having a solid portion shaped to form a barrier between the passage in said shank, and the space defined by the inwardly shaped wall portion of the drill body and the recess in said shank, and a solid plug of hard resin material filling the space within the recess in said shank exterior to the end portion of said drill body.

7. A drill as defined in claim 6 in which the end of said tubular drill body within the recess in said shank has a brazed connection with a side surface of said segmental disc.

8. A method of making gun drills which comprises forming elongated cylindrical tubular stock uniformly completely from end to end to a cross-section in which one side of the body is shaped inwardly to form an exterior channel extending approximately to the axis of said body and to leave a passage extending longitudinally therethrough, cutting off a required length of stock to form a drill body, seating an end of the drill body in a cylindrical recess in a drill shank having a passage extending therethrough with the passage in the drill body in communication with the passage through said shank and with said exterior channel in endwise alignment with a portion of the passage extending through the shank, bonding the abutting surfaces of the end portion of the drill body and recess, and forming a plug in the recess exterior to the end portion of the drill body therein.

9. A method of making gun drills which comprises forming elongated cylindrical tubular stock uniformly completely from end to end to a cross-section in which one side of the body is shaped inwardly to form an exterior channel extending appproximately to the axis of said body and to leave a passage extending longitudinally therethrough, cutting off a required length of stock to form a drill body, seating an end of the drill body in a cylindrical recess in a drill shank having a passage extending therethrough with the passage in the drill body in communication with the passage through said shank and with said exterior channel in endwise alignment with a portion of the passage extending through the shank, bonding the abutting surfaces of the end portion of the drill body and recess, and casting a resin plug in the recess exterior to the end portion of the drill body therein.

10. A method of making gun drills which comprises forming elongated cylindrical tubular stock uniformly completely from end to end to a cross-section in which one side of the body is shaped inwardly to form an exterior channel extending appproximately to the axis of said body and to leave a passage extending longitudinally therethrough, cutting off a required length of stock to form a drill body, seating an end of the drill body in a cylindrical recess in a drill shank having a passage extending therethrough with the passage in the drill body in communication with the passage through said shank and with said exterior channel in endwise alignment with a portion of the passage extending through the shank, brazing the abutting surfaces of the end portion of the drill body and recess, and forming a plug in the recess exterior to the end portion of the drill body therein.

11. A method of making gun drills which comprises forming elongated cylindrical tubular stock uniformly completely from end to end to a cross-section in which one side of the body is shaped inwardly to form an exterior channel extending approximately to the axis of said body and to leave a passage extending longitudinally therethrough, cutting off a required length of stock to form a drill body, providing a shank having a passage extending therethrough and an enlarged cylindrical recess in communication with said passage, seating a flat segmental disc in said recess, seating an end portion of the drill body in said recess against said disc, said disc being shaped to afford communication between the passage through said shank and the passage through said drill body while closing the bottoms of the chamber defined between the external surface of the inwardly shaped side of said drill body and the wall of said recess, bonding together the adjacent surfaces of said recess, disc, and drill body, and providing a solid plug of hard material in the aforesaid chamber.

12. A method of making gun drills which comprises forming elongated cylindrical tubular stock uniformly completely from end to end to a cross-section in which one side of the body is shaped inwardly to form an exterior channel extending approximately to the axis of said body and to leave a passage extending longitudinally therethrough, cutting off a required length of stock to form a drill body, providing a shank having a passage extending therethrough and an enlarged cylindrical recess in communication with said passage, seating a flat segmental disc in said recess, seating an end portion of the drill body in said recess against said disc, said disc being shaped to afford communication between the passage through said shank and the passage through said drill body while closing the bottoms of the chamber defined between the external surface of the inwardly shaped side of said drill body and the wall of said recess, brazing together the adjacent surfaces of said recess, disc, and drill body, and providing a solid plug of hard material in the aforesaid chamber.

13. A method of making gun drills which comprises forming elongated cylindrical tubular stock uniformly completely from end to end to a cross-section in which one side of the body is shaped inwardly to form an exterior channel extending approximately to the axis of said body and to leave a passage extending longitudinally therethrough, cutting off a required length of stock to form a drill body, providing a shank having a passage extending therethrough and an enlarged cylindrical recess in communication with said passage, seating a flat segmental disc in said recess, seating an end portion of the drill body in said recess against said disc, said disc being shaped to afford communication between the passage through said shank and the passage through said drill body while closing the bottoms of the chamber defined between the external surface of the inwardly shaped side of said drill body and the wall of said recess, bonding together the adjacent surfaces of said recess, disc, and drill body, and providing a solid plug of hard resin material in the aforesaid chamber.

References Cited in the file of this patent
UNITED STATES PATENTS

| | | |
|---|---|---|
| 1,189,727 | Oakley | July 4, 1916 |
| 1,784,932 | Hoagland | Dec. 16, 1930 |